May 27, 1924.
W. J. DREW
ANTISKID DEVICE
Filed Nov. 12, 1917
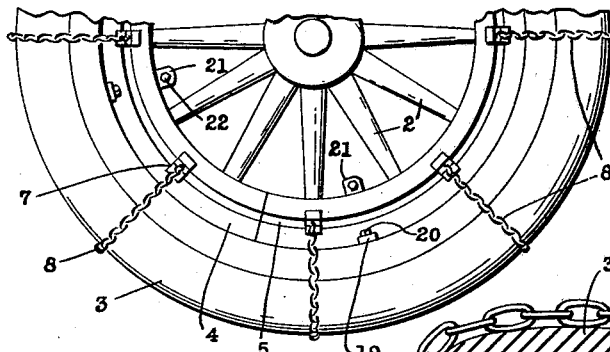
Fig. 1.
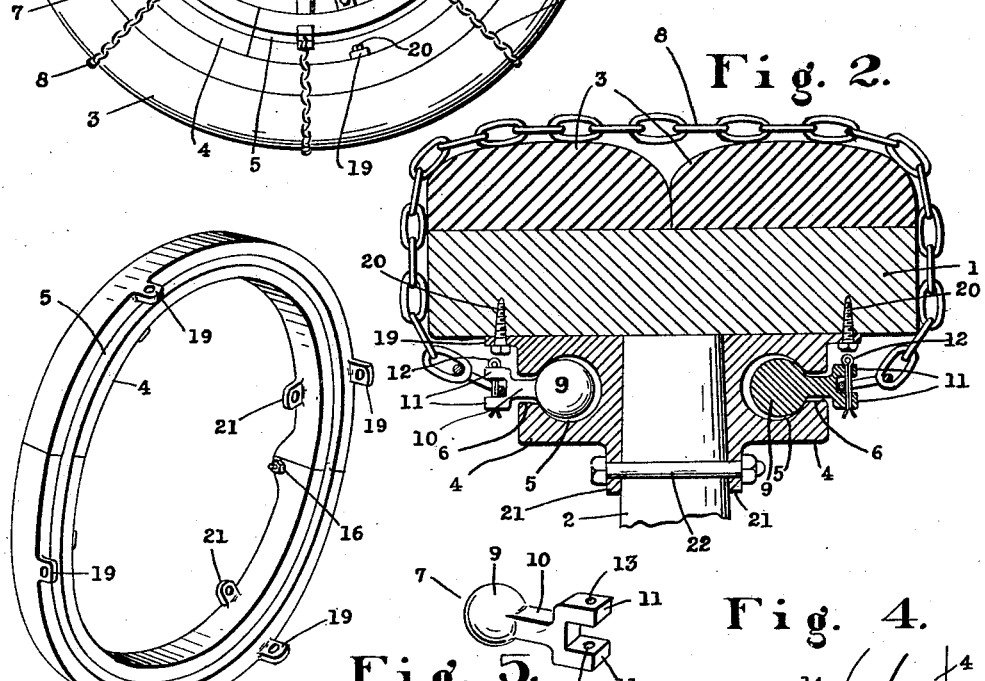
Fig. 2.
Fig. 3.
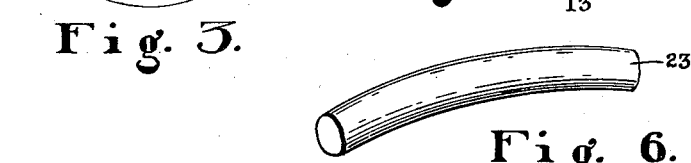
Fig. 5.
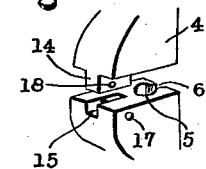
Fig. 4.
Fig. 6.
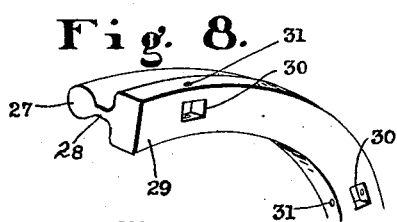
Fig. 8.
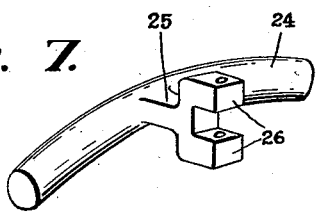
Fig. 7.
WITNESS:
Howard P. King
INVENTOR:
Walter J. Drew
BY
Marble & Everett,
ATTORNEYS.

Patented May 27, 1924.

1,495,168

UNITED STATES PATENT OFFICE.

WALTER J. DREW, OF PERTH AMBOY, NEW JERSEY.

ANTISKID DEVICE.

Application filed November 12, 1917. Serial No. 201,664.

*To all whom it may concern:*

Be it known that I, WALTER J. DREW, a citizen of the United States of America, and a resident of Perth Amboy, in the county of Middlesex and State of New Jersey, have invented new and useful Improvements in Antiskid Devices, of which the following is a specification.

This invention relates to means for utilizing chains upon the treads of vehicle wheels to give them a better hold upon slippery or unstable surfaces, and more particularly it relates to chains for automobile trucks, although of course the device can be employed wherever it may be found useful.

The objects of the invention are to secure the necessary strength to prevent breakage under the heavy strains of auto trucks or the like, and at the same time secure a construction which shall not be cumbersome or too expensive; to allow the cross-chains to creep circumferentially of the wheel, with respect to the means which support them upon or attach them to the wheels and at the same time maintain the cross-chains in uniformly spaced relation circumferentially of the wheel; to thus enable said supporting or attaching means to be made fast or stationary with respect to the wheel and the cross-chains independently and slidably connected to said supporting means; to thus secure strength and avoid wear upon the wheel such as would mar or break the same; to secure a simple and efficient construction; to permit individual cross-chains to be readily removed or replaced, and to secure other advantages and results as may be brought out in the following description.

Referring to the accompanying drawings, in which like numerals of reference indicate the same parts throughout the several views, Figure 1 is a side elevation of a portion of a wheel to which my invention has been applied;

Figure 2 is a cross-section through the rim and tire of a wheel to which my invention has been applied upon larger scale than Fig. 1;

Figure 3 is a perspective view of the means by which the cross-chains are attached to the wheel;

Figure 4 is a perspective view of the interlocking ends of said attaching means;

Figure 5 is a detail perspective view of one of the members slidable in said attaching means for securing the cross-chain thereto;

Figure 6 is a perspective view of a spacing unit for holding the slidable chain-attaching members apart;

Figure 7 is a perspective view of a slidable chain-attaching member and spacing unit combined, and Figure 8 is a perspective view of a portion of a further modified slidable chain-attaching member to which a plurality of chains may be secured.

In the specific embodiment of the invention illustrated in said drawings, the reference numeral 1 indicates the felly of a wheel carried by spokes 2 and supporting a tire 3 upon its outside as usual. While I have shown particularly a wheel such as used upon automobile trucks with a broad felly and solid tires, it is not to be understood that the invention is restricted to application thereto. In carrying out my invention I provide a ring or annular guide 4 upon each side of the wheel, preferably adjacent the spokes and felly and having its center in the axis of the wheel. These rings are secured to the wheel, so as to turn with the wheel and so as to have no relative movement between themselves or the wheel. Within each ring 4 is a groove 5 extending in a direction circumferentially of the ring and having a constricted or throat portion 6 opening at the side of the ring away from the spokes.

Slidably mounted within the grooves, and held therein by virtue of said throat portion 6, are a plurality of chain-holding members or anchorages 7 to which cross-chains or tread members 8 may be attached. The chains pass around the tread of the tire from the ring at one side of the wheel to the ring at the other side. It will be noted that, by this construction, the several chains carried by the supporting means or rings 4, may creep around the wheel so as not to always cross the tire at the same place. That is, rotation of the wheel upon a surface with the consequent tension exerted upon each cross-chain as it passes between the surface and the wheel, will cause the chain-holding member of such cross-chain to slip within the groove 5, thus permitting the chain to cross the tread at another point. The wear occasioned by this creeping occurs between the fixed supporting means or ring and the slidable holding members where it does no harm.

The particular chain-holding means or anchorages shown in Figures 1, 2 and 5, comprises a ball-like head 9 adapted to slide within the said groove 5 of the ring, but too large to pull out through the throat or constricted portion 6 of said groove. A tongue 10 small enough to pass through said throat 6 projects from the said ball-like head 9, and is preferably forked at its projecting end thus providing ears 11, 11 separated from each other for receiving therebetween the end link of the chain 8. A cotter pin 12 may be introduced in appropriate holes 13, 13 in said ears passing through said ears and the link inserted therebetween. Removal of the cotter pin 12 releases the chain when it is desired to take the chain off or replace it, and obviously this may be done very easily and quickly. When the chains are not in use, it is preferable to leave the holding members 7 within the supporting means or ring 4, each chain being released at its opposite ends from the said holding members as above described.

Preferably the rings are of such construction that the holding members may be inserted within the groove without affecting the continuity of the groove when the ring is mounted upon the wheel for use. In the present disclosure I have shown the rings each divided into two semi-circular halves so that when separated an end of the groove will be exposed into which the head 9 of the holding members may be inserted. When all of the holding members are thus applied to the ring, its sections may be again united thus permitting the said members to travel completely around the ring without interruption. In order to aline the ends of the sections so the grooves in said sections will coincide exactly at the ends, I preferably provide a mortice joint at said ends. That is, on the end of one section I provide a tongue 14 adapted to enter a slot 15 in the cooperating end of the other section. A bolt 16 may be passed through transverse holes 17, 17 in the slotted member and a hole 18 in the tongue of the other member, which aline when the said sections are brought together in proper position.

For mounting the rings non-rotatably upon the wheel I have shown lugs 19 at the outer periphery of each ring so as to lie against the felly and receive lag screws 20 which screw into the felly. For greater security and for preventing tension of the chains from pulling the rings outwardly in opposite directions, I provide other lugs 21 at the sides of the rings toward the spokes in planes parallel thereto and between opposite pairs of which in the two rings bolts 22 may be passed, clamping said rings toward each other.

The chain-holding members 7 are preferably spaced one from another, suitable means being provided for holding them in such spaced relation. For use with the holding members 7 shown in Figures 1, 2 and 5, I provide spacing units or bars 23, shown particularly in Figure 6, adapted to lie within the groove 5 between the heads 9 of two adjacent chain-holding members. For this purpose, the said spacing units 23 are curved corresponding to the curvature of the groove, and while these units are preferably small enough in diameter to slide freely within the said groove, they are large enough so as to be prevented from escape through the throat portion 6 of said groove. It will be seen that with these spacing units alternating with the chain-holding members, around the entire wheel, that, except for lost motion, slipping of one pair of chain-holding members as above described will cause sliding of the other chain-holding members also.

If desired, the chain-holding members and the spacing means may be combined as an integral member. Such a member is shown in Figure 7, in which an elongated or bar-like head 24 is provided corresponding in shape to the spacing unit 23. That is, the head 24 is curved to correspond to the curvature of the groove and is also of a diameter sufficient to prevent it from passing through the throat portion 6 of said groove. This head 24 has projecting from a part of itself a tongue 25 with outwardly forked ends 26, 26 corresponding to the tongue 10 and forked ends 11, 11 of the preferred construction. As shown in the drawings, this tongue projects substantially intermediate the ends of said head 24, although this might be otherwise. Obviously, a plurality of such members having the ends of their head portions 24 abutting will distribute the forked ends 26 in spaced distances around the wheel, similar to the spacing of the forked ends 11, 11 around the wheel as shown in Figure 1.

If desired, a plurality of the chain-holding means may be united in a single member. This I have shown in Figure 8 wherein a head portion 27 is shown having the curvature of the groove and extending as far as desired, for instance, half way around the wheel. From one side of this head 27 extends a tongue 28 in the form of a web and integral with an outer ring 29 having recesses 30, 30 at spaced distances within which the end links of the chain may be inserted. Holes 31, transverse to the recesses permit cotter pins to be passed through the recesses and links thus holding the chains to the member.

It will be observed that the cross-chains 8 are free to creep over the entire circumference of the tread of the wheel, and are at the same time maintained in uniformly spaced relation circumferentially of the wheel. There is no sliding movement of the chains alternately in opposite directions as is common where the chains are movable for short distances between stops or the like fixed on the supporting means for the chains, so that the construction embodying the invention is substantially noiseless in operation when the vehicle is in motion, and the uniform spacing of the chains ensures the proper traction at all times. Further, in the construction shown in Figures 1—7 inclusive, the cross-chains are independently and slidably connected to the annular guides 4 so that there is no tendency for one chain to increase the friction between the other chains and the annular guide, as is the case where a continuous ring or the like is slidable in the annular guide with all the chains connected thereto, wherein the tension on a chain passing between the wheel and the ground tends to pull the ring at the opposite side of the wheel into frictional engagement with the annular guide.

Other detail modifications and changes may be made in manufacturing my improved anti-skid device without departing from the spirit and scope of the invention, and I do not wish to be understood as restricting myself except as required by the following claims when construed in the light of the prior art.

Having thus described the invention, what I claim is,

1. In an anti-skid device for vehicle wheels, an annular supporting means adapted to be fixed with respect to the wheel upon each side thereof and providing a continuous slideway for its entire circumference, a plurality of independent tread members having their ends independently and slidably mounted in said slideways, said tread members being adapted to extend across the tread of the tire, and being free to creep with respect to said slideways and tire, and means interposed between the ends of adjacent ones of said tread members and unconnected therewith for maintaining the same in spaced relation.

2. In an anti-skid device for vehicle wheels, annular supporting means adapted to be fixed with respect to the wheel and providing a continuous slideway for its entire circumference, chain-holding members slidably mounted in said slideway, and curved spacing bars between said members and likewise slidably mounted in the slideway.

3. In an anti-skid device for vehicle wheels, an annular supporting means adapted to be fixed with respect to the wheel upon each side thereof, said supporting means being formed in complemental arcuate sections detachably connected together, said arcuate sections being formed with intercommunicating continuous grooved slideways having restricted circumferential slots through one side thereof, a member slidably mounted in each of said slideways and having a reduced portion projecting outwardly through said restricted circumferential slot, and a tread member extending over the tread of the tire and having its ends connected to said sliding members in the slideways so as to be free to creep with respect to said slideways and tire.

4. In an anti-skid device for vehicle wheels, an annular guide, a plurality of tread member anchorages, each of said anchorages being attached to a member slidably co-operating with said guide and adapted to travel in the circular path thereby determined, and spacing members adapted to maintain said anchorages approximately at fixed distances from each other in the path determined by said guide.

5. In an anti-skid device for vehicle wheels, the combination of an annular guide mounted upon the wheel, and a plurality of tread members independently and slidably connected to said annular guide, said tread members being capable of movement over the entire periphery of the said annular guide.

6. In an anti-skid device for vehicle wheels, the combination of an annular guide mounted upon the wheel, a plurality of cross chains, and anchorages connecting said chains independently and slidably to said annular guide, said cross chains being capable of movement over the entire periphery of said annular guide.

7. In an anti-skid device for vehicle wheels, the combination of an annular guide mounted upon the wheel, a plurality of tread members independently and slidably connected to said annular guide, said tread members being capable of movement over the entire periphery of the said annular guide, and means for maintaining said tread members in spaced relation with each other.

8. In an anti-skid device for vehicle wheels, the combination of an annular guide mounted upon the wheel, a plurality of cross chains, anchorages connecting said chains independently and slidably to said annular guide, said cross chains being capable of movement over the entire periphery of said annular guide, and means for maintaining said cross chains in spaced relation with each other.

9. In an anti-skid device for vehicle wheels, the combination of an annular guide adapted to be mounted upon the wheel, and a plurality of tread members connected to said annular guide and free to creep over the entire circumference of the tread of said wheel.

10. In an anti-skid device for vehicle wheels, the combination of two annular guides adapted to be mounted one on each side of the wheel concentric therewith, a plurality of tread members adapted to extend across the tread of said wheel, and anchorages for connecting said tread members to said annular guides, said anchorages being movable circumferentially of said guides throughout the entire peripheries thereof so that said tread members are free to creep over the entire circumference of the tread of the wheel.

In testimony whereof I have signed this specification in the presence of two subscribing witnesses.

WALTER J. DREW.

Witnesses:
 HOWARD P. KING,
 MILDRED E. BROOKS.